United States Patent
Shook et al.

(10) Patent No.: US 8,825,453 B2
(45) Date of Patent: Sep. 2, 2014

(54) PIPING ANALYSIS SYSTEMS

(75) Inventors: Daniel Shook, Sugar Land, TX (US); Mark Thompson, Sugar Land, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 291 days.

(21) Appl. No.: 13/303,029

(22) Filed: Nov. 22, 2011

(65) Prior Publication Data

US 2013/0132040 A1    May 23, 2013

(51) Int. Cl.
*G06F 17/50* (2006.01)

(52) U.S. Cl.
USPC .................................... 703/1; 703/7

(58) Field of Classification Search
USPC ......................................... 703/1, 7
See application file for complete search history.

(56) References Cited

U.S. PATENT DOCUMENTS

| | | | |
|---|---|---|---|
| 4,627,593 A | 12/1986 | Salter | |
| 5,497,295 A | 3/1996 | Gehly | |
| 5,517,428 A | 5/1996 | Williams | |
| 5,715,587 A | 2/1998 | Ziu | |
| 6,502,791 B2 | 1/2003 | Parker | |
| 7,624,002 B2 | 11/2009 | Berwanger | |
| 7,917,339 B2 | 3/2011 | Bourgeois et al. | |
| 8,033,511 B2 | 10/2011 | Grivas et al. | |
| 2005/0236059 A1 | 10/2005 | Kamiyama et al. | |
| 2006/0090805 A1 | 5/2006 | Friedline et al. | |
| 2007/0083398 A1 | 4/2007 | Ivey et al. | |
| 2010/0042379 A1 | 2/2010 | Minnar et al. | |
| 2010/0263884 A1 | 10/2010 | Perkovich et al. | |

FOREIGN PATENT DOCUMENTS

| | | |
|---|---|---|
| WO | 2009/055545 | 4/2009 |
| WO | 2011/087501 | 7/2011 |

OTHER PUBLICATIONS

Patent Cooperation Treat, "Notification of Transmittal of the International Search Report and the Written Opinion of the International Searching Authority, or the Declaration", PCT Application No. PCT/US12/66041, issued Feb. 8, 2013.

"Bently AutoPIPE V8i—The Most Productive Tool for Pipe Stress Analysis", Bentley Systems, Incorporated, Bentley Product Data Sheet, 2010.

*Primary Examiner* — Thai Phan
(74) *Attorney, Agent, or Firm* — Fish & Tsang, LLP

(57) ABSTRACT

A piping analysis system capable of generating proposed piping support assemblies when off-the-self part is unavailable is presented. Contemplated analysis systems comprise a piping modeling system, which models a piping infrastructure as piping nodes having attributes describing the nature of the nodes. A piping support assembly design engine aggregates the attribute information from piping nodes and correlates the attributes with known materials that might be applicable for constructing the proposed assemblies. The design engine generates a proposed assembly and configures an output device to present the assembly along with a likelihood representing feasibility that the proposed assembly can in fact be designed or manufactured.

15 Claims, 3 Drawing Sheets

PIPING ANALYSIS SYSTEMS

FIELD OF THE INVENTION

The field of the invention is piping analysis or modeling technologies.

BACKGROUND

Large scale capital construction projects often require a massive analysis or model of a facility's piping network or infrastructure. For example, an oil refinery or processing plant can include hundreds of miles of pipes, joints, valves, or other types of piping structures. When a basic model of the facility's piping is first generated, there is requirement for modeling physical piping supports that hold the piping structures in place. However, as the project matures, engineers must handle the physical reality of physically supporting the piping infrastructure within the facility. Designers or engineers eventually incorporate piping support assemblies into their plant designs, possibly based on off-the-shelf available supports (e.g., springs, hangers, struts, etc.). Unfortunately, many plant construction projects often require custom or specialized piping supports assemblies that are outside the capabilities of known piping support assemblies. In such scenarios designers lack insight into if such a custom piping support assembly could actually be designed or manufactured.

Others have put forth effort toward modeling piping systems. For example, U.S. Pat. No. 5,517,428 to Williams titled "Optimizing a Piping System", filed May 2, 1994, describes optimizing a piping system by minimizing the system's weight while ensuring the system falls within the bounds of design constraints. Williams provides some insight into piping system design, but fails to address the question if applicable piping support assemblies could even be designed to support the piping system.

Another example includes U.S. Pat. No. 7,624,002 to Berwanger "Apparatus and Method for Creating Scaled, Three-Dimensional Model Hydraulic System to Perform Calculations", filed Sep. 7, 2004. Berwanger indicates that a hydraulic system comprising pipes and fittings can modeled, which can then be automatically verified. Berwanger also fails to appreciate that piping support assemblies should also be modeled or even designed to fit within the piping infrastructure.

Yet another example includes U.S. Pat. No. 7,917,339 to Bourgeois et al. titled "Heat Trace System Design", filed Nov. 5, 2007. Although Bourgeois focuses on heat trace system design, Bourgeois also discusses modeling piping systems where piping system components (e.g., flanges, values, supports, and instruments) are determined based on extracted piping system data. However, Bourgeois assumes components are available and lacks any useful indications if a piping assembly support could in fact be designed let alone manufactured.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for piping analysis systems capable of determining if a piping support assembly can be designed or manufactured.

SUMMARY OF THE INVENTION

The inventive subject matter provides apparatus, systems and methods in which one can utilize a piping analysis system to determine if a piping support assembly can, in fact, be designed. One aspect of the inventive subject matter includes a piping analysis system having one or more modeling engines. For example, in some embodiments, the system comprises a piping analysis engine configured to model a piping infrastructure, possibly as part of a capital construction project or program. A piping model can include multiple piping nodes reflecting real-world piping members (e.g., pipes, turns, valves, etc.). Preferably, each node further comprises attributes or values that describe the nature of corresponding piping members. The analysis system can further comprise a materials database storing information about materials that can be used to construct a piping support assembly (e.g., strut, spring, hanger, clamp, tray, etc.), which would physically support a real-world piping structure. A design engine communicatively coupled with the materials database and the piping analysis engine compares piping node attributes from the model with material properties of the materials database to identify which materials would be best suited for a piping support assembly capable of supporting a piping structure corresponding to the piping node. Based on the material properties and the node attributes, the design engine generates a proposed piping support assembly having characteristics and that can be integrated within the piping model, or more preferably within a plant construction model. Further, the design engine determines or otherwise derives a design likelihood that proposed assembly could in fact be designed or manufactured. The design engine can further configure an output device (e.g., plant construction modeling engine, printer, display, 3D object printer, etc.) to present the proposed piping support assembly along with the design likelihood.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server piping analysis or design system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on TCP, UDP, IP, HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing an infrastructure capable of generating a proposed piping support assembly.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, within a networking environment "coupled with" or "coupled to" should be construed to mean "communicatively coupled with" where two elements can communicate over a network connection, possibly via a standard or proprietary protocol.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
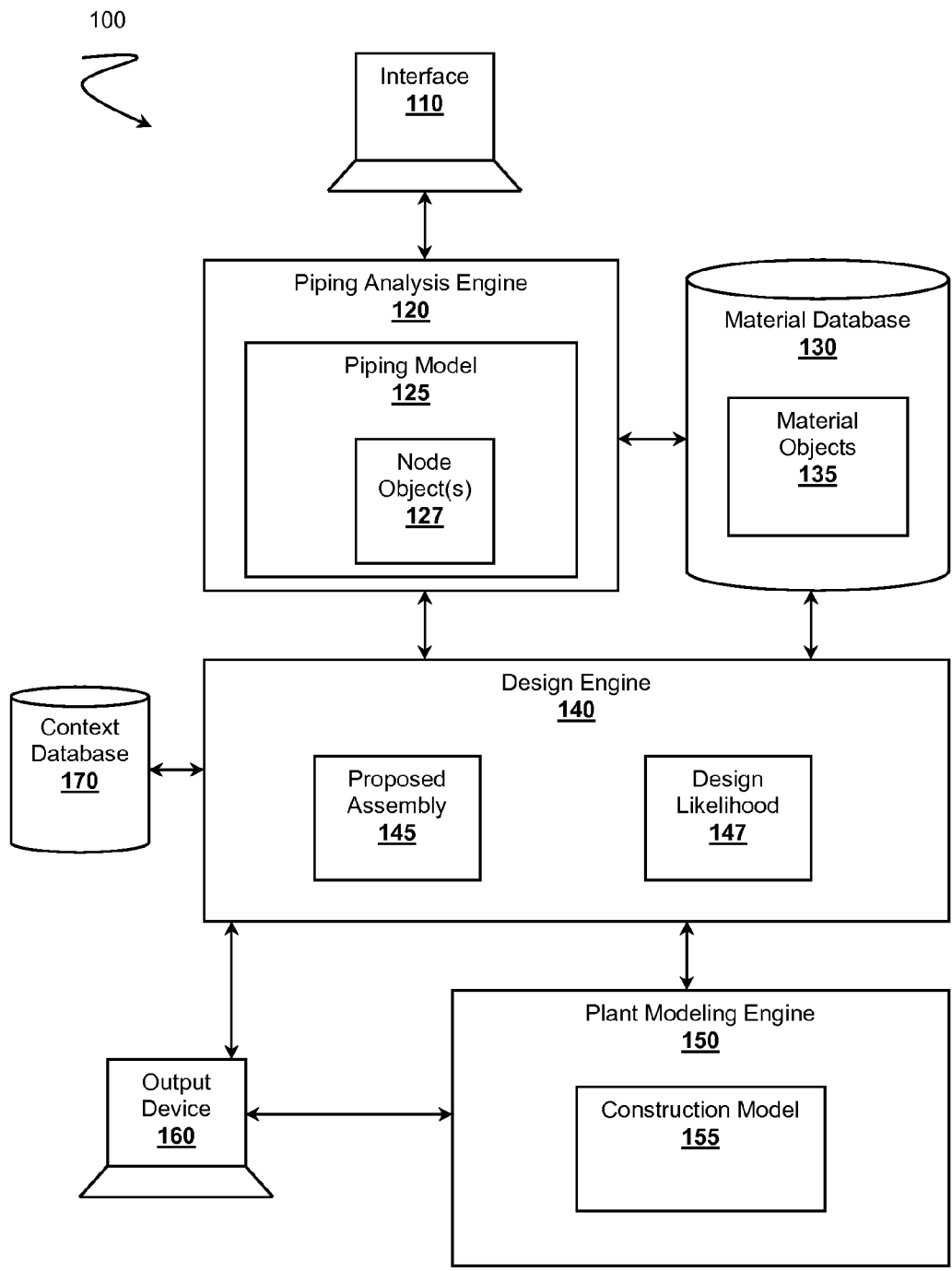
FIG. 1 is a schematic of piping analysis ecosystem.

FIG. 1 piping analysis system 100 capable of offering design engineers insight into a feasibility of designing or even manufacturing a piping support assembly. Analysis system 100 comprises numerous components communicatively coupled with each other, possibly over a network (not shown; LAN, WAN, wireless, Internet, etc.) or even possibly within a single computer system via a communication bus. Contemplated analysis systems 100 can comprise piping analysis engine 120, material database 130, design engine 140, or possibly plant modeling engine 150. Users of system 100 can access the functionally of system 100 via one or more interfaces 110 or output devices 160. Although interface 110 is illustrated as coupling with piping analysis engine 120 one should appreciate that interface 110, or output device 160 for that matter, can coupled with other components of system 100.

Interface 110 can comprise a suitably configured computing device capable of interacting with piping analysis engine 120. In some embodiments, interface 110 comprises the same computer as piping analysis engine 120, possibly operating as locally resident application. In other embodiments, interface 110 can function as a remote interface that accesses piping analysis engine 120 over a network, perhaps within a browser—HTTP server context.

Preferably, interface 110 cooperates with piping analysis engine 120 to present piping model 125 to one or more design engineers. An example pipe design or analysis system that can be suitably adapted for use within the disclosed subject matter includes AutoPIPE® offered by Bentley® (see URL www.bentley.com/en-US/Products/Bentley+AutoPIPE/).

Piping model 125 can be represent a full spectrum of possible piping infrastructures including oil refineries, chemical processing plants, power plants, mining facilities, gas processing facilities, offshore oil or gas platforms, HVAC systems, hydraulic systems, nuclear power heat exchangers, or other types of piping infrastructures.

One should appreciate that each type of piping infrastructure carries its own set of requirements, possibly born out of government or jurisdictional requirements. It is especially contemplated that piping model 125, or its constituent nodes 127, carry design requirements or optional conditions dictating the overall nature of the project. Thus, piping analysis engine 120, or other components, can determine if the design requirement or conditions are being met for the type of project. For example, two distinct projects might comprise very similar pipe runs that might include identical piping materials. However, the two projects might have drastically different design requirements for the pipe run that could affect how the pipe run should be physically supported. Thus, a pipe run having a length of pipe for a nuclear power plant would likely have different safety support requirements than a similar length of pipe for a chemical processing plant.

One should appreciate that piping supports having one or more physical requirements to physically support a piping structure. Example physical requirements can include load, heat resistance, flow ratings, resistance to corrosion, shear or stress requirements, or other factors that affect the ability to support a piping member. Thus, each context can carry its own physical requirements for the piping support assembly. Further, the physical requirements might exceed the capabilities of known piping support assemblies or typical materials used to construct piping support assemblies.

Piping analysis engine 120 is preferably configured to generate piping model 125 where the model comprises one or more of piping node objects 127. Each piping node object 127 can be considered a distinct manageable object representative of a corresponding piping structure or component within the model. Example piping structures that can be modeled by piping node object 127 include a pipe, joint, valve, support assembly, fitting, instrument, sensor, or other type of structures. Although piping support assemblies can be modeled within piping model 125, one should appreciate that the modeled support assemblies might not be designable or producible. Preferably each of piping node objects 127 also comprises attributes or values, possibly as metadata, that describe the nature of node 127 as discussed further with respect to FIG. 2.

Piping analysis system 100 further comprises material database 130, which stores one or more material objects 135 on computer readable media. Material objects 135 can be considered separately manageable objects describing materials from which a piping support assembly can be constructed. In some embodiments, material objects 135 could represent actual materials possible including a metal, an alloy, a wood, a composite, a fiber, a plastic, or other type of material that can be used to construct a piping support assembly. Further, material objects 135 can represent more complex components constructed from of various materials. Example components could include nuts, lugs, bolts, brackets, springs, struts, hangers, plates, or other components. The components can include actual off-the-shelf available parts or could represent virtual parts or templates having sufficient instructions or data that piping analysis engine 120 or design engine 140 could render the parts in a model.

Each of material objects 135 further includes one or more property describing the nature of the object, especially with respect to the capabilities of the object when employed to construct a piping support assembly. For example, when material object 135 represents an actual material, the attributes might include bulk modulus, elasticity, melting point, or other properties of the material. If the material object 135 represents a more complex structure (e.g., bolt, nut, tray, strut, spring, etc.), the attributes could include strength, maximum rated load, minimum or maximum allowable temperatures, or other information.

Preferred piping analysis systems 100 further include design engine 140. Design engine 140 could be the same computing system as piping analysis engine 120. However, in other embodiments design engine 140 can be a separate or distinct engine. Design engine 140 preferably couples with piping analysis engine 120 and material database 130, possibly over a network (e.g., Internet, LAN, WAN, wireless, etc.), and is configured to generate one or more proposed piping support assemblies 145 capable of physically supporting the piping infrastructure as modeled by piping model 125.

Design engine 140 aggregates attributes from node objects 127 and material objects 135 to identify appropriate materials that can be used to construct proposed piping support assembly 145. For example, based on the information obtained from node objects 127, design engine 140 can correlate at least one or more node attributes with one or more properties of the material objects 135. The correlation can be established through various techniques. In more preferred embodiments, node attributes and material properties can be normalized to a common support assembly namespace or taxonomy thus allowing design engine to search for appropriate materials by following links within a support assembly design ontology or design rule set that logically connects node attributes with material properties.

If a correlation between the attributes of node objects 127 and material objects 135 is established, design engine 140 attempts to generate a proposed piping support assembly 145 as a function of the piping attributes of piping node object 127 and the properties of the material objects 135. One should note that proposed piping support assembly 145 preferably does not example match a known off-the-shelf part or piping support assembly. Rather proposed piping support assembly 145 represents a specialty type of assembly, fit for purpose assembly, or custom assembly for use in the actual plant under construction. For this reason, among others, design engine 140 seeks to find material objects 135 that have properties that might be applicable to construct a customer piping support assembly, even if material objects 135 might not be able to satisfy the physical requirements.

In some embodiments, design engine 140 can leverage one or more assembly support templates, possibly stored as a material object 135, to generate proposed piping support assembly 145. Contemplated templates can represent various types of known piping support assemblies where the template can be fleshed out based on the attributes of node objects 127 and properties of material objects 135. In some embodiments, the template can include a piping support datasheet, possibly in a serialized format based on XML, where the values of the datasheet are generated from the attributes and properties. An example template format could include those based on established standards, ANVIL® catalogs for example. A datasheet that is fleshed out, at least partially, can be considered a representation of proposed piping support assembly 145 and can be transmitted or otherwise exchanged among components of system 100. For example, the datasheet can be sent to plant modeling engine 150, which can then render proposed piping support assembly 145 within construction model 155 as a function of the fleshed out information in the datasheet.

Still, one should appreciate, although rendered, the proposed piping support assembly 145 might not, in fact, be producible in reality especially when the assembly corresponds to a customized or special type of assembly.

Especially preferred proposed piping support assemblies 145 include springs, struts, hangers, trays, expansion joints, insulated shoes, anchors, plates, snubbers, clamps, bolts, or nuts. Consider a spring. Design engine 140 leverages attribute information from piping node object 127 (e.g., size, dimension, regulations, location, position, orientation, weight, etc.) to determine which type of spring might be considered for use with the piping node object 127. In some scenarios, a constant spring might be most relevant while in other scenarios a variable spring might be appropriate. The parameters of the spring can be generated from attribute information and from properties of the known material objects. Thus proposed piping support assembly 145 representing a variable spring would likely include desirable properties of an internal coil where resistance of the coil changes or varies while under compression or tension (e.g., where the spring constant of the spring varies with the load). Other properties of the spring might include a hanger size, rod size, welding lugs, casing diameter, loaded length (min or max), lug hold size, clevis opening, weight, size, dimension, or other parameters. Each type or class of support assembly has its own sent of parameters that can be fleshed out.

In some embodiments, design engine 140 can determine which type of support assembly should be used in a specific context. For example, design engine 140 can aggregate attribute information from one or more node objects 127 to construct a context within piping model 125. The attributes can define a scope within a context space, which can be compared to known contexts possibly stored in context database 170. Each context object stored in context database 170 can include recommended piping support assemblies that might be relevant to the context of node objects 127. In some embodiments, the context object can include links or pointers to one or more assembly templates that apply to the context. Further, the contexts can be constructed based on previously deployed real-world piping infrastructures. Thus, piping analysis system 100 can incorporate a historical perspective when generating proposed piping support assembly 145.

Design engine 140 preferably is further configured to generate a design likelihood 147 that proposed piping support assembly 145 can actually be designed as a function of the material properties and node attributes. The design likelihood 147 can be calculated according many different techniques reflecting the feasibility of creating the customized assembly. One technique includes comparing how the material proprieties of material objects 135 exceed or fall within the requirements or optional conditions to support node objects 127. Thus, the design likelihood 147 could include a value representing how well proposed piping support assembly 145 constructed from material objects 135 meet design requirements.

One should note that the physical requirements do not necessarily equate to design requirements for a piping support part. Rather, the design requirements reflect one or more aspects that a part can, in fact, be designed or manufactured. There are numerous reasons why an assembly might not be designable. For example, physical constraints or tolerances associated with node objects 127 or their contexts might exceed the physical capabilities of material objects 135. Another example might include that materials exist capable of satisfying physical requirement, but there are no known methods of manufacture capable of producing a part. Still, further if an assembly can be manufacture, the cost might be prohibitive. Regardless of the reason, design likelihood 147 reflects to what degree, certainty, or probability that proposed piping support assembly 145 can be constructed.

Design likelihood 147 can comprise a single value or multiple values. Single values likelihoods can be considered an indication that a customized assembly can in fact be manufactured. Example single value likelihoods could span a range, possibly a normalized range: −100 to 100. A design likelihood of −100 could indicate that proposed assembly 145 can not be designed or produced with high certainty while 100 might indicate the proposed assembly 145 can most certainly be designed or manufactured, or indicate an acceptable known part exists. All single valued or normalized ranges are contemplated. Multi-valued likelihoods can be considered an N-tuple or possibly a vector of values where each member value in the likelihood can represent a different design aspect of proposed piping support assembly 145. Example design aspects could include designability, manufacturability, similarity to off-the-shelf parts, costs, or other aspects. Thus, proposed piping support assembly might have a designable rating of 100, while having a manufacturability of −50 on a normalized scale.

In some embodiments design likelihood 147 can include one or more confidence levels representing an estimated certainty associated with corresponding feasibility values within design likelihood 147. Confidence levels can be derived based on statistics gathered from previously use of known, similar piping support assemblies, or as a function of the physical requirements relative to the various properties of material objects 135. For example, the physical requirements might include supporting a vibrating load for years. A possible material having a known Young's modulus might or might not allow for manufacturing of a support assembly capable of supporting the load. The confidence level can be derived by mathematically comparing the Young's modulus to the physical requirements, possibly based on an estimated Mean Time Between Failures (MTBF).

Further, design likelihood 147 can also include values representative of other parameters beyond a probability of success. One especially contemplated parameter can include recommendations on a manufacturer. Consider a scenario where proposed assembly 145 represents a constant spring support that must be created. Design engine 140 determines that a known constant spring support is similar to proposed assembly 145. Based on a similarity score derived from a comparison of the characteristic of proposed assembly 145 to known springs, design engine 140 can rank the known spring according to similarity scores. The manufacturer of the highest ranked known spring can be identified from the properties of the corresponding material object 135 and can be recommended as a possible contact for creating the proposed constant spring, even if the manufacturability of the proposed piping support assembly 145 indicates a low probability of success.

Design engine 140 can submit proposed piping support assembly 145 and design likelihood 147 to one or more output devices 160. In some embodiment, design engine 140 configured output device 160 to present proposed assembly 145 and design likelihood 147 to a user, possibly via a display. In more preferred embodiments, output device 160 can include plant modeling engine 150 configured to render proposed assembly 145 within a plant construction model 155. Further, the plant modeling engine 150 can provide one or more indications of design likelihood 147 for proposed assembly 145. For example, a corresponding assembly part within construction model 155 can be highlighted, colored, tagged, or otherwise modified to indicate the likelihood that the assembly can, in fact, be designed or manufactured. An example modeling tool that can be suitably adapted for use as plant modeling engine 150 include SmartPlant 3D or PDS offered by Intergraph®, PDMS by Aveva®, AutoPLANT by Bently, or PlantWise by Bentley.

In some embodiments, output device 160 could include a 3D printer capable of generating a 3D model of the proposed assembly 145. In such an embodiment, the 3D model could be annotated with design likelihood 147. For example, the 3D model can be color coded where color represents each constituent element of the design likelihood for the element. Additionally, the colors could be arranged according to contours indicating, possibly based on finite element analysis, how design likelihood 147 varies across the constituent elements. An example 3D printer that could be suitably adapted for use with the disclosed techniques include the ZPrinter® offered by Z-Corporation® (see URL www.zcorp.com).

One should note the presentation of design likelihood 147 for proposed assembly 145 can be presented based on its actual use or load. Thus, design likelihood 147 could have temporal aspects indicating the feasibility of designing or manufacturing proposed assembly 145 with respect to time. In view that capital construction projects can take years to complete, the information available within material database 130 can change possibly representing improved materials or newly available known parts. Changes within material database 130 or material objects 135 can be reflected within design likelihood 147.

Figure 2:
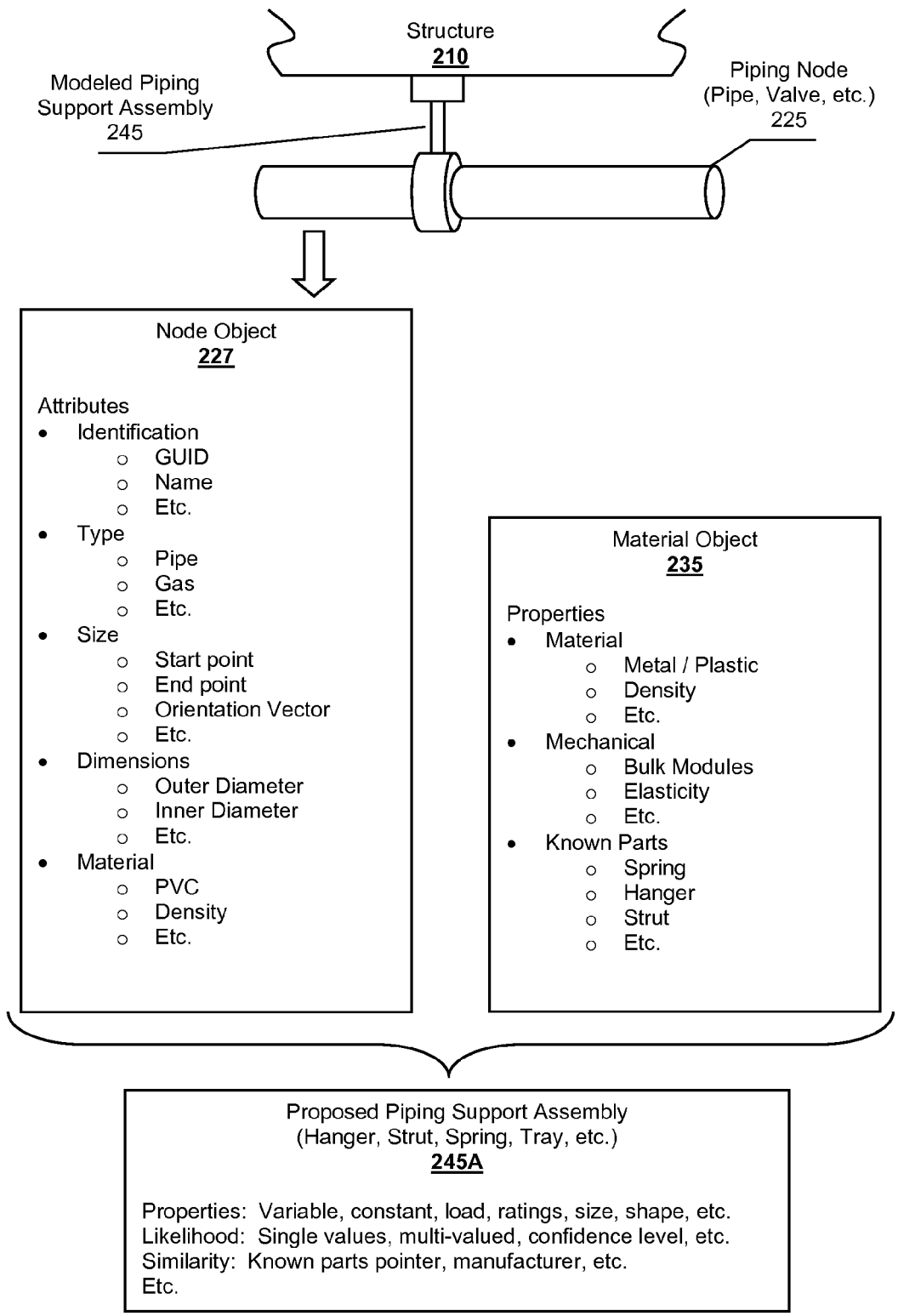
FIG. 2 is an overview of generation of a proposed piping support assembly.

FIG. 2 provides a more detailed overview generating proposed piping support assembly 245A based on modeled piping support assembly 245. Within a piping analysis engine, a piping model includes one or more piping nodes 225. In the example shown, piping node 225 represents a length of pipe as supported by modeled piping support assembly 245. Piping node 225 also exists within a context associated with one or more plant structures 210 (e.g., walls, floors, scaffolding, other pipes, etc). Modeled piping support assembly 245 is presented for illustrative purposes only to indicate how a support would fit within the piping model context and might not actually be part of the piping model.

A design engine, as discussed previously, obtains attributes associated with node object 227, which corresponds to piping node 225. The attributes of node object 227 can include a broad spectrum of information about piping node 225. Some attributes can be considered metadata describing node object 227. Example metadata can include names, identifiers (e.g., GUIDs, UUIDs, etc.), name of creator, project name, tags, or other information. Node object 227 preferably includes more detailed information about piping node 225 representing an actual proposed structure for the corresponding piping element. Examples can include a type of structure, type of material to be transported through the structure, size, dimensions, orientations, preferred materials, or other types of detailed information. In more preferred embodiments, the attributes are normalized according to a common nomenclature, namespace, or taxonomy that can be easily compared to the properties of material objects 235.

Similar to node objects 227, material objects 235 include properties describing the nature of material object 235. Material object 235, as discussed previously, can represent an actual material, simple parts (e.g., bolts, nuts, lugs, etc.), or even complex parts (e.g., springs, struts, hangers, etc.). The properties within material object 235 can also cover a broad spectrum of characteristics. Especially preferred properties include material properties (e.g., density, type of material, etc.), mechanical properties (e.g., rated loads, bulk modulus, ductility, shear modulus, etc.), manufacturing properties (e.g., castability, extruding pressure or temperature, hardness, machinability rating, etc.), electrical properties (e.g., conductivity, resistance, permeability, etc.), chemical properties (e.g., reactivity, etc.), names, manufacturer, source, cost, type of part, or other characteristics.

Node object 227 can also include many other types of properties including properties associated with a context for piping node 225. Example context properties could include jurisdictional properties, geological properties (e.g., earthquake rating, tsunami ratings, etc.), weather or environmental properties, or other features. Such properties can influence the feasibility of manufacturing proposed support assembly 245A.

Material objects 235 can be arranged in a hierarchy where complex objects comprise links or pointers to less complex objects. For example, a variable spring object could include links to the lugs, nuts, or bolts used to secure the spring to a surface. The nuts, bolts, or lugs could also be represented by material object 235 and link to the materials which compose the hardware elements. Creating a hierarchy of material objects 235 allows a design engine to explore how proposed piping support assembly 245A could or might be constructed by allowing the design engine to walk links in the hierarchy and comparing properties to the attributes or requirements of piping node 227.

As discussed previously, a design engine aggregates attributes from node objects 227 and properties from material object 235 to generated proposed piping support assembly 245A. In the example shown, modeled piping support assembly 245 could be considered a template, possibly based off the ANVIL catalog. The design engine uses the information to derive features associated with proposed assembly 245A, possibly including its design properties (e.g., size, dimension, variable or constant spring coil requirements, length, load ratings, etc.). Further, the design engine determines the design likelihood for proposed assembly 245A as a function of properties associated with material object 235 where the design likelihood reflects one or more aspects of the feasibility that proposed assembly 245A can be designed or manufactured. Further, the design engine can also generate a similarity score indicating how similar proposed assembly 245 is to known off-the-shelf parts.

Proposed piping support assembly 245A can take on many forms. In more preferred embodiments, proposed assembly 245A comprises a datasheet, possibly in a serialized format, that can be exchanged with other components of the piping analysis system. Preferably, the resulting datasheet can be imported into a plant construction modeling engine, which in turn renders or presents the proposed assembly 245A along with the design likelihood.

Figure 3:
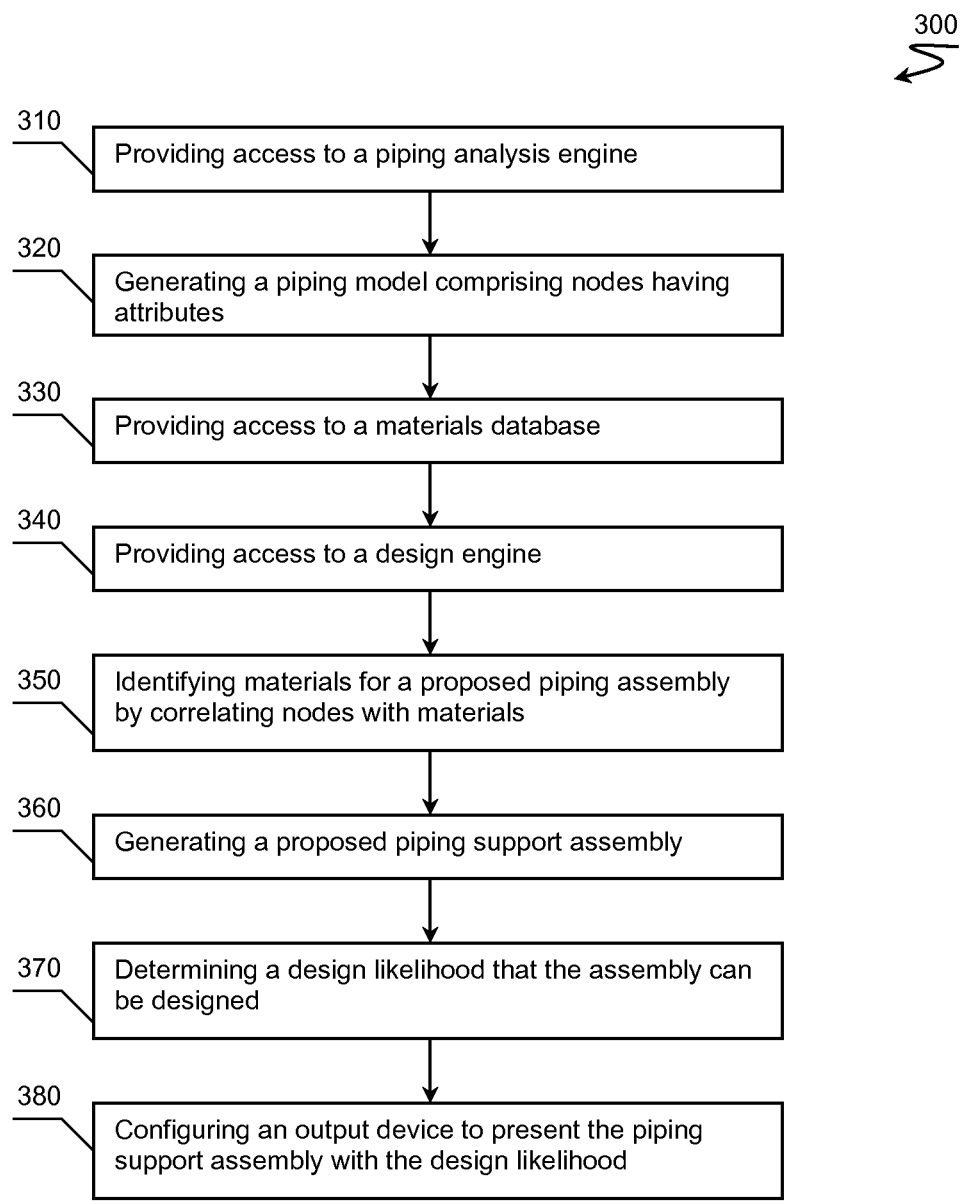
FIG. 3 is a schematic of a method generating a proposed piping support assembly.

FIG. 3 provides an overview of method 300 generating a proposed piping support assembly. Step 310 includes providing access to a piping analysis engine. Access can be provided over a network or via one or more computing workstations suitably configured to conduct modeling or analysis of piping infrastructure. An example piping analysis engine can comprises AutoPIPE available from Bentley®.

Step 320 comprises generating a piping model within the piping analysis engine where the model comprises one or more piping nodes representing piping structures. Each of the piping nodes preferably comprises one or more attributes describing the attributes of the node, possibly including the context of the piping node. The attributes can adhere to one or more standard nomenclatures, ontologies, or taxonomies so that attributes from one object can be compared to attributes of other objects.

Step 330 can include providing access to a materials database storing information about materials that can be used to construct piping support assemblies (e.g., constant springs, variable springs, struts, hangers, clamps, etc.). In some embodiments, material objects stored in the material database can be indexed by their properties, which can also align or correspond to the nomenclature or taxonomy used for piping nodes. Further, the material objects can be linked together to form a hierarchy of objects where a complex object, a variable spring for example, can include links to less complex objects or even materials that compose the top level object. The material objects stored in the materials database can also include representations of previously used off-the-shelf parts, catalogs of known parts, known materials, or other items that can be used to construct a piping support assembly.

Step 340 include providing access to a design engine, preferably a piping support design engine. In some embodiments, the piping support engine includes a piping analysis engine; AutoPIPE for example. However, it is also contemplated that the design engine could be a separate, distinct entity configured to have the roles or responsibilities of determining if a proposed piping support assembly can actually be designed or manufactured.

Step 350 includes the design engine identifying materials for a proposed piping assembly by correlating attributes of piping nodes with properties of materials in the materials database. As discussed previously, one method of establishing a correlation can include using the attributes of one or more piping nodes to identify a possible context for the piping node. The context can then be linked with one or more piping support templates that might be applicable to the context. The design engine can search the materials database for materials that could in principle be used to construct the piping support assembly based on the template. In other embodiments, piping node attributes can be linked to material properties via one or more design rules set.

Step 360 can comprise the design engine generating a proposed piping support assembly. In embodiments where piping support templates are available, the design engine preferably fleshes out values of the templates as a function of the material properties and piping node attributes. It is also contemplated that a design engine user can leverage the information to configure the design engine to generate a proposed piping support assembly that at least partially satisfy physical requirements or optional conditions of a support assembly. In yet more preferred embodiments, the proposed piping support assembly can take the form of a datasheet which can be imported by other tools in the ecosystem; possibly based on a serialized format such as XML.

Step 370 includes the design engine determining or otherwise deriving a design likelihood representing feasibility that the proposed piping support assembly can in fact be designed or manufactured. The design likelihood can comprises one or more values reflecting various aspects of the feasibility including designability, manufacturability, cost, or other aspects. The design likelihood can be calculated by calculating or estimating if the proposed assembly can be achieved, possibly based on a similarity of known off-the-shelf parts. The design likelihood information can be incorporated into the datasheet mentioned in Step 360.

Step 380 includes the design engine configuring an output device to present the piping support assembly with the design likelihood. In more preferred embodiments, a plant construction design tool, SmartPlant 3D for example, can import the datasheet and render a corresponding support assembly within a construction model. In other embodiments, a printer, possibly a 3D printer, can be configured to generate a model of the proposed assembly. Regardless of how the proposed assembly is presented, the output device can also present the design likelihood possibly as a tag, color, color contour, notification, recommendation or other presentation.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A piping analysis system, comprising:
    a piping analysis engine configured to generate a piping model comprising piping nodes, each node further comprising node attributes;
    a material database storing material objects having material properties;
    a design engine coupled with the piping analysis engine and the material database and configured to:
        identify materials for a proposed piping support assembly by correlating at least one piping node's attributes with material properties of at least one material object;
        generate a proposed piping support assembly as a function of the piping node's attributes and the material properties;
        determine a design likelihood that the proposed piping support assembly can be designed; and
        configure an output device to present the proposed piping support assembly and design likelihood to a user.

2. The system of claim 1, further comprising a plant modeling engine coupled with the design engine and operating as the output device.

3. The system of claim 2, wherein the proposed piping support assembly comprises a datasheet representation of a piping assembly understandable by the plant modeling engine.

4. The system of claim 3, wherein the datasheet comprises a serialized format.

5. The system of claim 2, plant modeling engine is configured to render the proposed piping support assembly within a plant construction model.

6. The system of claim 1, wherein the proposed piping support assembly represents a pipe support spring.

7. The system of claim 6, wherein the proposed piping support assembly represents a constant pipe support spring.

8. The system of claim 6, wherein the proposed piping support assembly represents a variable pipe support spring.

9. The system of claim 1, wherein the proposed piping support assembly represents a pipe strut.

10. The system of claim 1, wherein the proposed piping support assembly represents a pipe hanger.

11. The system of claim 1, wherein the design likelihood comprises a confidence level.

12. The system of claim 1, wherein the design likelihood comprises multiple values.

13. The system of claim 12, wherein the design likelihood comprises recommendations on a manufacturer.

14. The system of claim 1, wherein the design likelihood comprises a similarity to known piping assemblies.

15. The system of claim 14, wherein the known piping assemblies represent available off-the-shelf assemblies.

* * * * *